United States Patent
Ishigami

[11] 4,208,074
[45] Jun. 17, 1980

[54] HYDRAULIC PRESSURE CONTROL SYSTEM

[75] Inventor: Noriakira Ishigami, Chiryu, Japan

[73] Assignee: Aisin Seiki Company, Limited, Aichi, Japan

[21] Appl. No.: 928,422

[22] Filed: Jul. 27, 1978

Related U.S. Application Data

[63] Continuation of Ser. No. 839,593, Oct. 5, 1977, which is a continuation of Ser. No. 666,310, Mar. 12, 1976.

[30] Foreign Application Priority Data

Mar. 13, 1975 [JP] Japan .................................. 50/30872
Mar. 19, 1975 [JP] Japan .................................. 50/33734

[51] Int. Cl.² .............................................. B60T 8/26
[52] U.S. Cl. ...................................... 303/6 C; 303/84 A
[58] Field of Search ........................... 188/151 A, 349; 303/6 C, 84 A

[56] References Cited

U.S. PATENT DOCUMENTS

| | | | |
|---|---|---|---|
| 3,480,333 | 11/1969 | Stelzer | 303/6 C |
| 3,661,426 | 5/1972 | Tam | 303/6 C |
| 3,669,506 | 6/1972 | Papin et al. | 303/6 C |
| 3,719,382 | 2/1973 | Ayers, Jr. | 303/6 C X |
| 3,737,603 | 6/1973 | Kish et al. | 303/6 C X |

*Primary Examiner*—Duane A. Reger
*Attorney, Agent, or Firm*—Oblon, Fisher, Spivak, McClelland & Maier

[57] ABSTRACT

A hydraulic pressure control system for brakes for use within motor vehicles includes a split or dual type braking system having two brake lines. A metering valve is disposed within the front brake line so as to delay the build-up of pressure within the front disc brakes for a predetermined period of time in order to permit the rear drum brakes to be initially actuated, and a pressure-control valve is similarly disposed within the rear brake line for supplying a controlled or limited fluid pressure to the rear wheel brakes from the master cylinder. In the event of a hydraulic failure within the rear brake line, the metering function of the metering valve is immediately discontinued and full braking pressure is supplied to the front wheel brakes, from the master cylinder, without an initial delay in the build-up of pressure therewithin, and similarly, if a hydraulic failure occurs within the front brake line, the pressure control function of the pressure control valve is immediately discontinued and full braking pressure is likewise supplied to the rear wheel brakes, from the master cylinder, without control or limitation thereof. An electrical, failure-warning system is also incorporated within the system so as to be operatively associated with the pressure-control and metering valves thereof.

11 Claims, 29 Drawing Figures

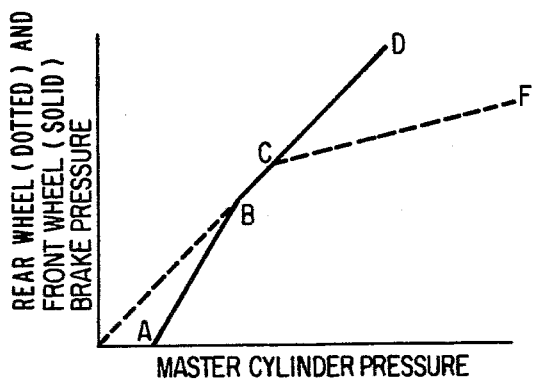
FIG. 3a
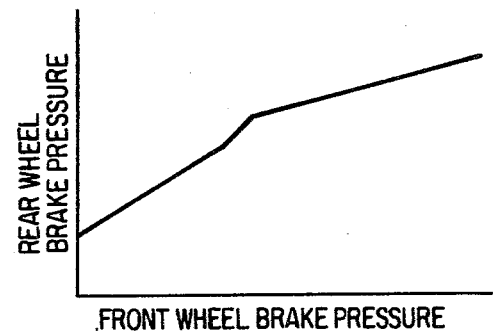
FIG. 3b
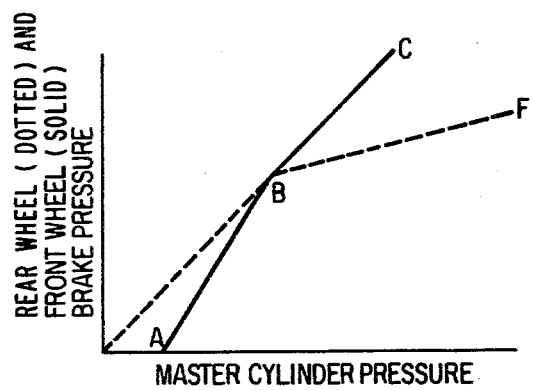
FIG. 3a'
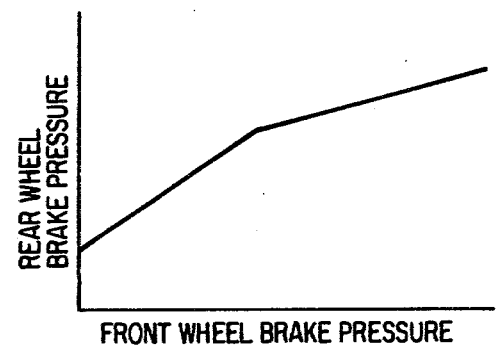
FIG. 3b'
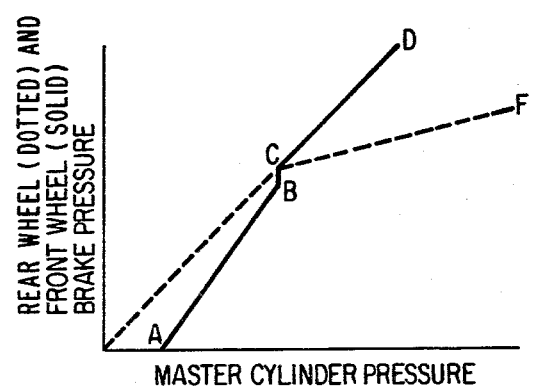
FIG. 3a"
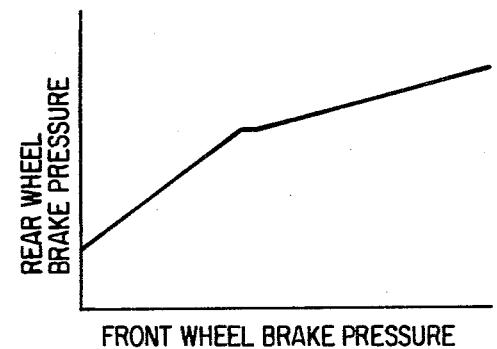
FIG. 3b"

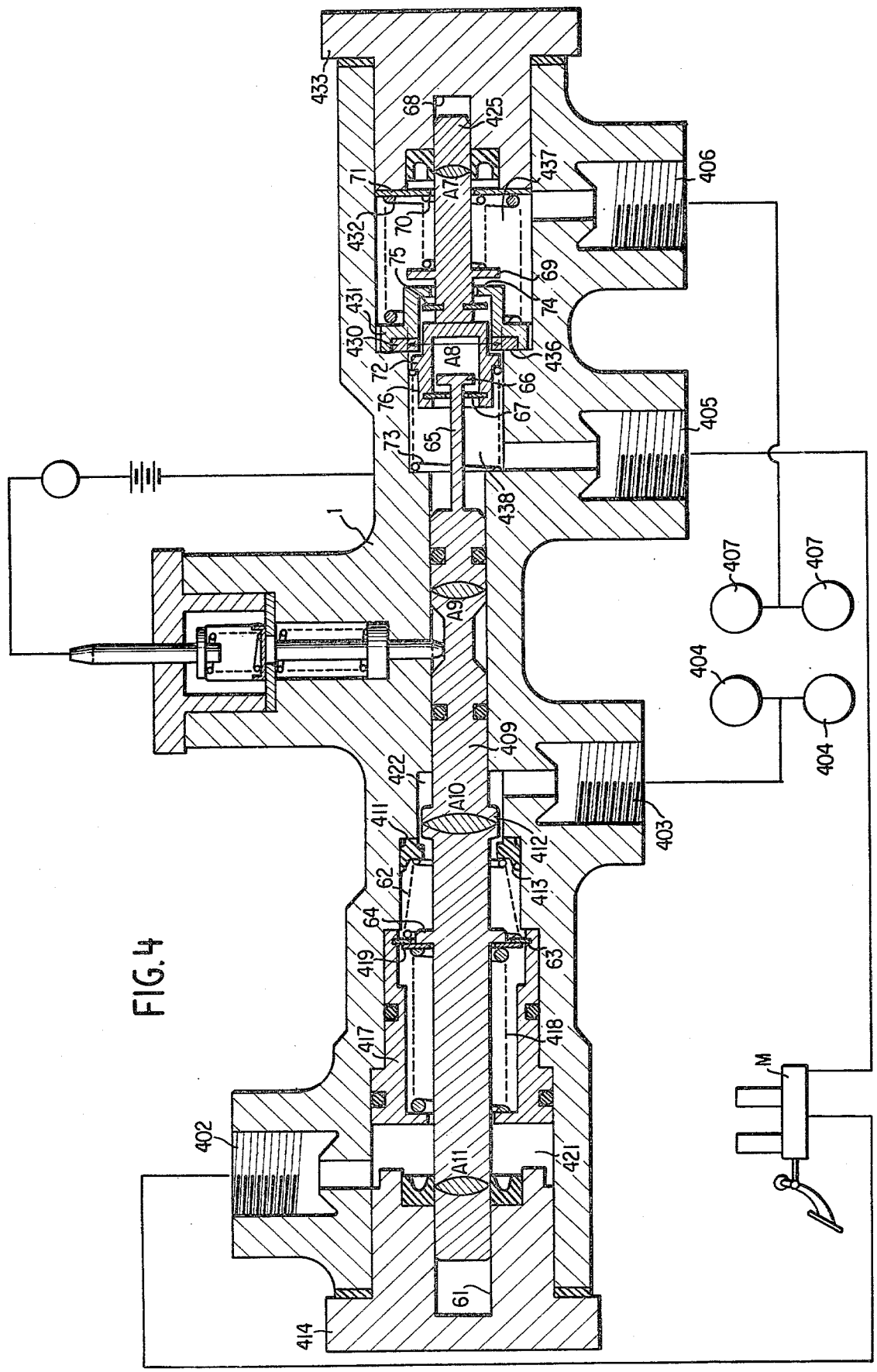

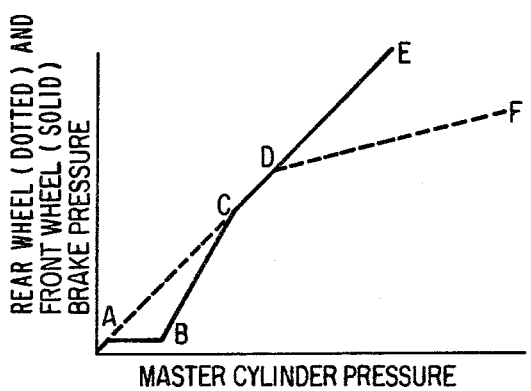
FIG.4a
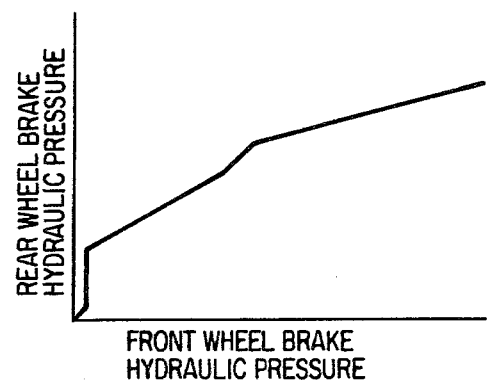
FIG.4b
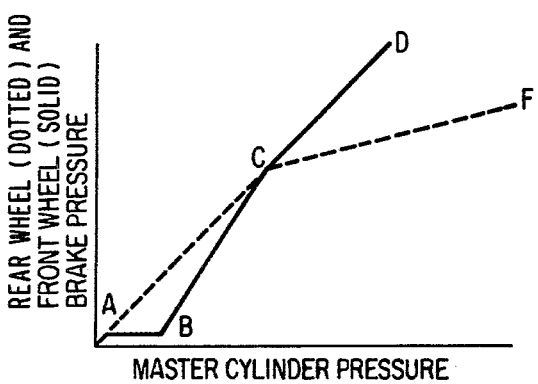
FIG.4a'
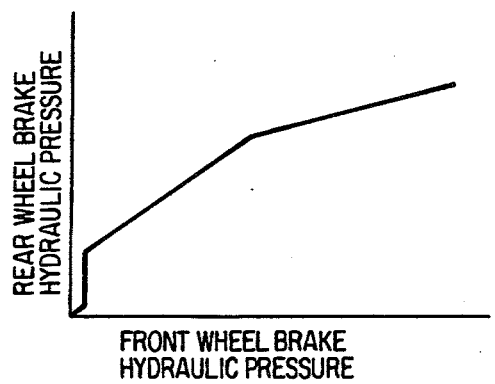
FIG.4b'
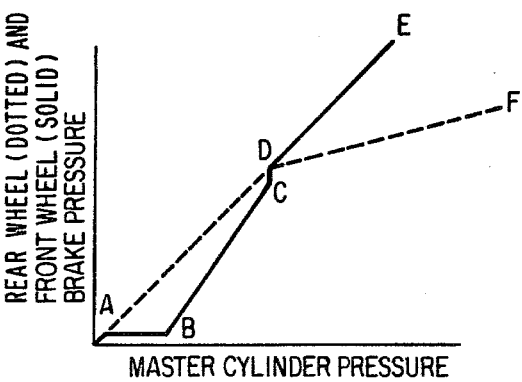
FIG.4a"
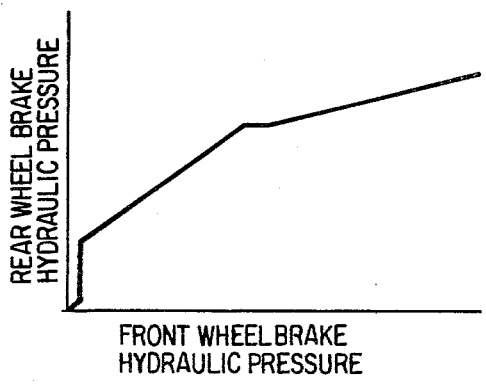
FIG.4b"

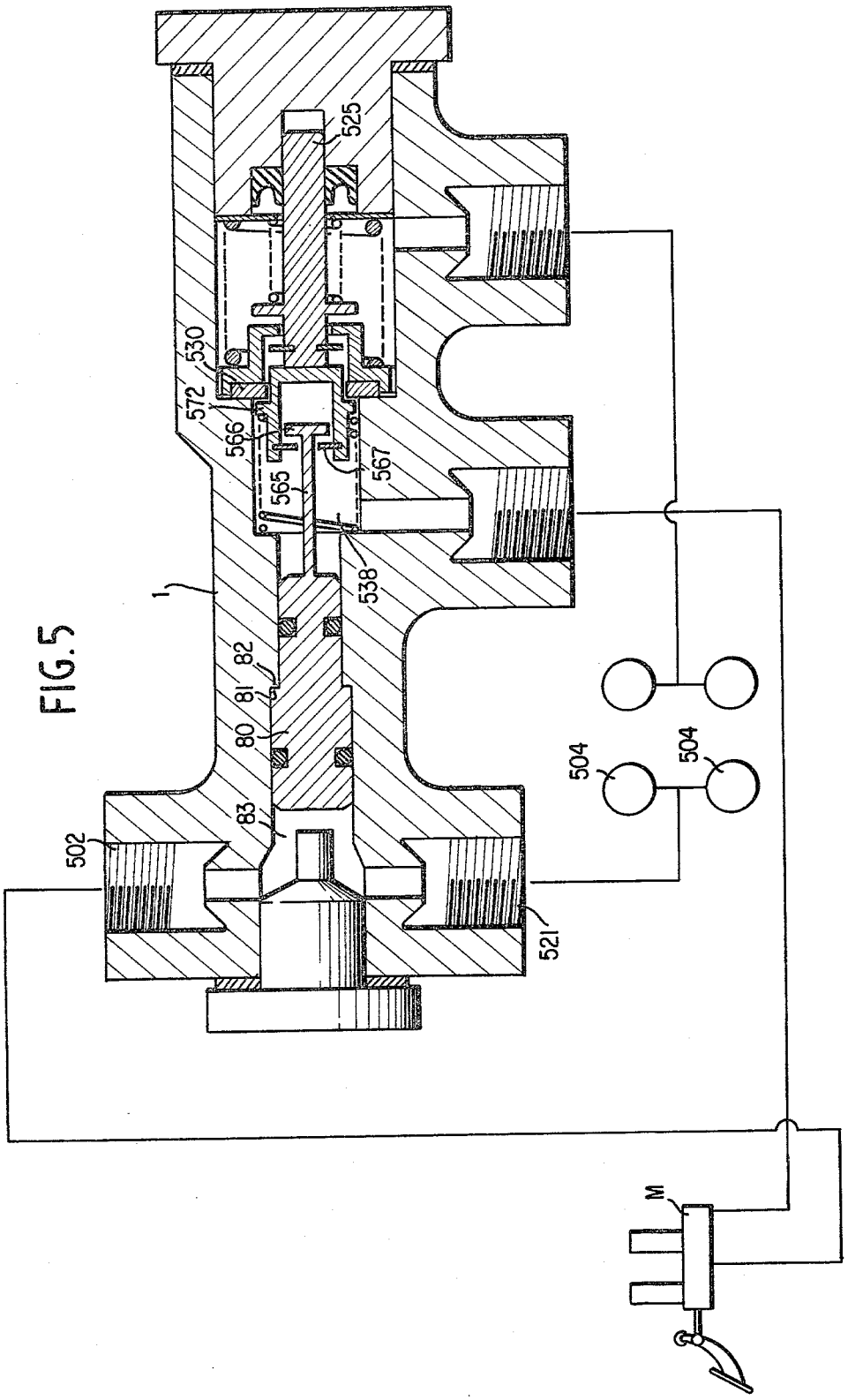

HYDRAULIC PRESSURE CONTROL SYSTEM

This is a continuation of application Ser. No. 839,593, filed Oct. 5, 1977, being a continuation of application Ser. No. 666,310 filed 3/12/76.

BACKGROUND OF THE INVENTION

1. Field of the Invention

The present invention relates generally to a hydraulic-pressure control system for two brake lines for use within motor vehicles, and more particularly to a pressure control valve for supplying a limited fluid pressure to one of the brake lines.

2. Description of the Prior Art

In order to cope with the fact that either of the two brake hydraulic circuits, but normally the front-wheel-brake hydraulic circuit, has failed or ruptured, with the result of failure to generate a braking hydraulic pressure, many attempts have been hitherto proposed for a control device which interrupts the operation of another hydraulic pressure control device within the rear wheel brake hydraulic circuit, thereby directly supplying an uncontrolled master-cylinder-hydraulic-pressure to the rear wheel brake circuit.

However, the prior art device dictates the use of a complex bypass circuit in addition to the rear wheel brake hydraulic circuit, whereby in the event of the failure of the front wheel hydraulic circuit, an uncontrolled hydraulic pressure is supplied by means of the aforenoted bypass circuit to the rear wheels.

Within a braking system utilizing disc brakes for the front wheels and drum brakes for the rear wheels of the motor vehicle, it is imperative to prevent the premature actuation of the front-wheel disc brakes prior to the actuation of the rear-wheel drum brakes so as to thereby achieve the safe running of the motor vehicle during the braking period.

Metering valves which have been hitherto used for achieving the aforenoted object, suppress the build-up in the actuating pressure within the front brakes for a predetermined period of time, immediately after the commencement of the braking operation, so as to permit the shoes of the drum brakes within the rear wheels to contact the drums during the aforenoted period of time, thereby bringing the shoes into an operable condition, in an attempt to cope with play within the rear-wheel brakes.

However, in the event of a failure of the rear-wheel braking system, it is mandatory that the actuation of the metering valve normally adapted to temporarily restrain the pressure build-up of the braking-hydraulic pressure within the front wheel, be interrupted, while causing the simultaneous and immediate commencement of the actuation of the front-wheel brakes for ensuring the safety of the motor vehicle.

SUMMARY OF THE INVENTION

Accordingly, it is an object of the present invention to provide a control device having a simple bypass means so as to compensate for an insufficient braking force by interrupting the control for the rear-wheel-brake hydraulic pressure in the event of a failure of the front-wheel brake hydraulic circuit, thereby directly supplying the hydraulic pressure from the master cylinder to the rear wheel brake wheel cylinders.

It is another object of the present invention to provide a control device which terminates the actuation of the aforenoted metering valve in the event of a failure of the rear-wheel brake system by providing a compact and simple construction, even if a P-valve and an alarming device are incorporated within the aforenoted system in combination therewith.

The control device of the present invention is devoid of the prior art bypass circuit and utilizes a hydraulic-differential-pressure-sensing piston to maintain the hydraulic pressure free of control by a valve which is used for controlling the hydraulic pressure so as to thereby supply an uncontrolled hydraulic pressure to the rear wheel brakes for compensating an insufficient braking force in the event of a failure of the front wheel hydraulic circuit. As a result, the construction of the device may be compact in size and simple, thereby saving space required therefor, with the accompanying advantage of smaller manufacturing costs. In addition, in case an alarm means is incorporated therein, the device according to the present invention permits the direct use of such an alarm means without modification thereof.

The foregoing and other objects are achieved in accordance with the present invention through the provision of a metering valve which is provided with a hydraulic pressure proportioning means responsive to the proportioned condition of the respective brake-actuating-input hydraulic pressures within the front and rear wheels, and a valve means operable in association with the hydraulic pressure proportioning means, whereby the metering valve will not be operated in the aforenoted event, even when the metering valve is in its actuating position.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein:

FIGS. 3a, 3a', 3a", 3b, 3b', and 3b" are performance curves of the embodiment of FIG. 3;

FIG. 4 is a view similar to that of FIG. 1, showing however, a fourth embodiment of the present invention;

FIGS. 4a, 4a', 4a", 4b, 4b' and 4b" are performance curves characteristic of the embodiment of FIG. 4;

FIG. 5 is a view similar to that of FIG. 1, showing however, a fifth embodiment of the present invention;

DETAILED DESCRIPTION OF THE ILLUSTRATED EMBODIMENTS

Figure 1:
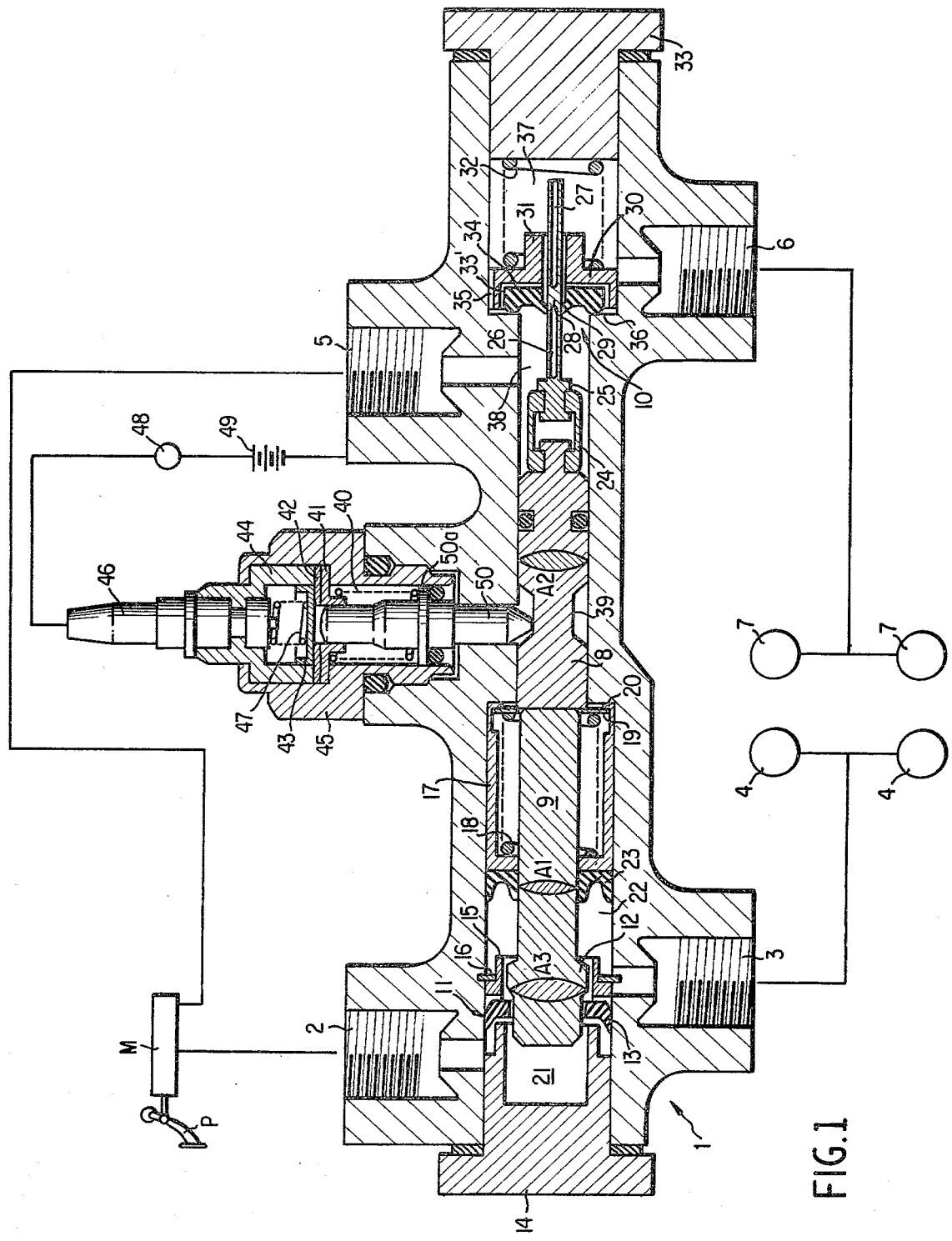
FIG. 1 is a longitudinal cross-sectional view of a first embodiment of a pressure control system constructed in accordance with the present invention and showing its cooperative parts.

Referring now to the drawings, and more particularly to FIG. 1 thereof, an inlet 2, disposed within the upper left portion of a body 1, is fluidically communicated with a pressure chamber, not shown, within a master cylinder M, as schematically shown by means of the solid line, while an outlet 3 disposed within the lower left portion of the body 1 is similarly communicated, by means of a circuit also schematically shown by means of another solid line, with rear wheel brakes 4. An inlet 5, disposed within the upper right portion of the body 1 is likewise communicated, by means of a circuit schematically shown by means of still another solid line, with another pressure chamber, not shown, within the master cylinder M, and an outlet 6, within the lower right portion of the body 1 being fluidically communicated with front wheel brakes 7, as schematically shown by means of yet another solid line.

Disposed within the central portion of the body 1 is a piston 8 to be used in conjunction with an alarm means, while a piston 9 is provided for use with a rear-wheel-braking-hydraulic-pressure control or P-valve, generally indicated by the reference character 11. Piston 9 is formed with a large diameter portion 12 and is located to the left of piston 8, and disposed to the right of piston 8 is a metering valve, generally indicated by the reference character 10.

The piston 9 is formed with the annular valve 12 which surrounds the outer periphery of the piston 9 at a position disposed adjacent to the left end of the piston 9, and surrounding the outer periphery, but in a spaced relationship with respect to the valve 12, is an annular or ring-shaped rubber valve seat 13 which is retained in its axial position by means of a plug 14, disposed upon one side of seat 13, and a ring 15 and a retaining ring 16 disposed upon the opposite side thereof. The right portion of piston 9, having the large diameter valve portion 12, is received within a sleeve 17 and abuts the left end of piston 8. A compression spring 18 is confined within sleeve 17, with the left end thereof abutting the inner surface of sleeve 17 while the other end thereof abuts an annular flange 20 of sleeve 17 through means of an annular retainer 19, the spring 18 thus being restricted from freely extending by means of the retainer 19 and flange 20.

Since the outer diameter of piston 8 is larger than the inner diameter of the retainer 19, the piston 8 may move toward the left, as shown, thereby compressing the spring 18, and as will be described hereinafter, in the instance that there is no resistance impressed upon sleeve 17, spring 18 and sleeve 17 may likewise move toward the left as a result of being biased by means of piston 8, with the spring 18 being maintained free of compression. It is noted that the inner diameter of retainer 19 should be such as not to hinder the movement of piston 9 having the increased diameter valve portion 12, and the following relationship is established for the pressure receiving areas of both pistons and the sealing cross-sectional areas of the P-valve 11:

$$A3 > A2 > A1$$

wherein

A1 = the pressure receiving or cross-sectional area of piston 9;

A2 = the pressure receiving or cross-sectional area of piston 8; and

A3 = the pressure receiving or cross-sectional area of the increased diameter valve portion or land 12 of piston 9.

A chamber 21 is defined between the left end of the P-valve 11 and plug 14, and another chamber 22 is defined between the P-valve 11 and sleeve 17. When a pressure prevails within chamber 22, the cup seal 23 is retained in position, and, as a result, serves as an anchor means for the left end of the spring 18 through means of the sleeve 17.

The piston 8 is coupled at its right end to another piston or stem portion 25, by means of a hollow tubular rubber seal 24, and provided within piston 25 are two elongated through-holes 26 and 27 which extend in the longitudinal direction thereof, a sealing portion 28 being interposed therebetween. Theh piston 25 extends through an opening defined by means of a lip 29 positioned in the center of a valve 30 which is integrally formed with a retainer 31, the latter being in turn, secured within body 1 by means of a plug 33 and a compression spring 32 interposed between plug 33 and retainer 31.

Defined within the outer periphery of valve 30 is an axial recess 33', and defined within the right end face of valve 30 is a radial recess 34, and thus, the central opening of valve 30 and the central opening of retainer 31 are in fluidic communication with the outer peripheral portion of valve 30. A guide 35 is also defined within the outer periphery of retainer 31 for permitting the flow of oil therethrough, and it is thus apparent that the valve 30, as shown, functions as a valve in cooperation with a valve seat 36 which is a radial shoulder portion of body 1. A chamber 37 is defined between valve 30 and plug 33, and another chamber 38 is similarly defined between valve 30 and piston 8.

Defined within the central portion of piston 8 is a tapered groove 39 with which the lower end of a plunger 50 is operatively engaged, and a transverse flange 50a of plunger 50 receives the lower end of a compression spring 40 while the upper end of compression spring 40 is received by means of a retainer 41. The retainer 41 also suppots a disc contact 43 through means of an insulating washer 42, and the retainer 41 and washer 42 are urged in position against the shoulder portion of the inner surface of a holder 45 by means of another holder 44. Confined between a plug 46 and the contact 43 is a compression spring 47 which biases the contact 43 against the washer 42 at all times, the holder 44 and insulating washer 42 being made of an electrically insulating material. As schematically shown by means of the solid line, the plug 46 is electrically connected by means of a lamp 48 and a potential source 49 to the body 1 so as to thereby constitute an alarm circuit.

Reference is now made to the operation of the embodiment of FIG. 1, which FIGURE shows the rest condition of the control device under normal operative conditions. When a brake pedal P is depressed, hydraulic pressure is introduced through means of the inlet 2 positioned within the upper left portion of the body 1, chamnber 21, P-valve 11 which is open, chamber 22, and outlet 3 into the rear wheel brakes 4.

Similarly, hydraulic pressure fed from the other pressure chamber within the master cylinder M is introduced into inlet 5 positioned within the upper right portion of body 1, and then into chamber 38. Under the condition as shown, the hydraulic pressure which has been introduced into chamber 38 is then fed past the right end of the elongated hole 26 within piston 25, and through or into the central opening of valve 30, the central opening of retainer 31, and chamber 37, so as to exit from outlet 6 to the front wheel brakes 7.

The time period, during which the aforenoted condition is maintained, is quite short and consequently, seal 24 is deformed, due to the hydraulic pressure prevailing within chamber 38, with the result that piston 25 is biased toward the left until piston 25 contacts piston 8. As a result, the sealing portion 28 engages lip 29 of valve 30, thereby interrupting the fluidic communication between chambers 38 and 37, which have been in communication with each other by means of the elongated hole 26.

Figure 1A:
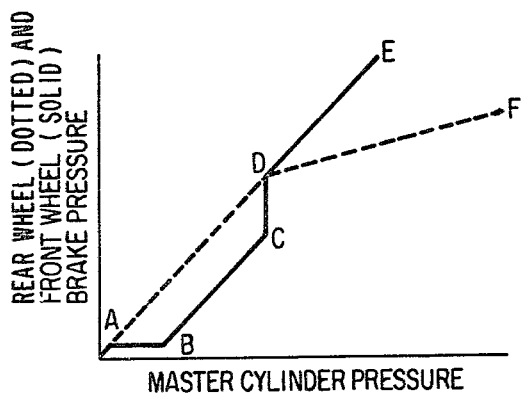
FIGS. 1a, 1aa, 1b, and 1bb are performance curves of the embodiment of FIG. 1.

Even if the pressure is increased within chamber 38, the pressure prevailing within chamber 37 will not be correspondingly increased. FIG. 1a shows the variations in the input hydraulic pressure of chmber 38 and the output hydraulic pressure of chamber 37, that is, the pressure transmitted into the front wheel brakes 7 in the condition described thus far, and the point A within FIG. 1a represents the time when the sealed portion 28 engages the lip 29. During the period from point A to point B, the pressure upon the output side, that is, within the front wheel brakes, will not be increased even if the pressure within the master cylinder and chamber 38 is increased. In this respect, the output side is disconnected from the master cylinder, and the above-noted condition will continue until the hydraulic pressure within chamber 38 overcomes the force of spring 32 thereby biasing valve 30 toward the right, during which time the shoes of the rear-wheel drum brakes have completed their contact phase with the drums, thus beginning the braking action.

When the hydraulic pressure within the master cylinder is increased to the point B, then the hydraulic pressure impressed upon valve 30, which has been seated, overcomes the biasing force of spring 32 so as to permit valve 30 to be disengaged from valve seat 36 whereby oil is forced out in a small amount from chamber 38 past the outer periphery of valve 30 and into chamber 37. When such a small amount of oil is forced into chamber 37, the pressure within chamber 37 is increased whereupon the valve 30 will again be seated against the valve seat 36.

The continuation of the pressure build-up within chamber 38 causes the valve 30 to repeat the opening and closing cyclic operation, until the pressure within chamber 37 is increased. During this time, if the valve 30 is seated, the master cylinder pressure within chamber 38 will act upon the average sealing area of valve 30 from the left, while the hydraulic pressure within chamber 37 and in communication with the rear wheel brakes 7 will act upon the same average sealing area of valve 30 from the opposite side thereof.

In this respect, the hydraulic pressure within chamber 37 may maintain the equilibrium with the hydraulic pressure within chamber 38 under the influence of the biasing force of spring 32 whereby the hydraulic pressure within chamber 37 is lower than the hydraulic pressure within chamber 38 by an amount corresponding to the biasing force of spring 32. The moment that both chamber 37 and 38 are brought into communication with each other due to the opening of valve 30, the pressure within chamber 37 will be increased in the manner described, due to the small amount of oil being introduced from chamber 38 into chamber 37, although such pressure build-up within chamber 37 will of course be stopped when the sum of the hydraulic pressure within chamber 37 and the force of spring 32 is brought into equilibrium with the hydraulic pressure within chamber 38, and such a condition will be maintained intact until the input hydraulic pressure to chamber 38 is increased.

In the aforenoted manner, the hydraulic pressure within chamber 37, and in communication with the front wheel brakes 7 is built-up or increased, and this condition is shown by the solid line confined between points B and C of FIG. 1a. When the hydraulic pressure reaches point C, then the piston 8 urges the piston 9 toward the left against the biasing force of spring 18, due to the hydraulic pressure within chamber 38, until the valve 12 contacts valve seat 13 thereby closing P-valve 11. Simultaneously therewith, piston 25 follows the movement of piston 8 so as to also move further toward the left, and as a result, the left end of the elongated hole 27 within piston 25 will move beyond lip 29 so as to be exposed within chamber 38 thereby allowing the continued communication between chambers 38 and 37.

This causes the pressure within chamber 37 to be substantially instantaneously built-up to the level equal to the level of the pressure within chamber 38, this condition being represented by the solid line C–D within FIG. 1a and thereafter, as shown by means of the solid line D–E, the master cylinder pressure is fed directly to the front wheel brakes 7. Meanwhile, the rate of the pressure build-up within the rear wheel brakes 4 varies at the point D, as shown by means of the dotted line within FIG. 1a, due to the actuation of the P-valve 11 having the piston 9 formed with the increased diameter valve portion 12, and a description will now be given of the operation of the P-valve 11.

Since the area A1, of such portion of the piston 9 upon which is fitted cup seal 23, is smaller than the pressure receiving area A2 of the piston 8, even if hydraulic pressures of the same value are present within chamber 38, as well as within chambers 21 and 22, both pistons 8 and 9 will integrally move toward the left which movement causes the valve 12 to contact the valve seat 13 thereby closing the same whereby fluidic communication between chamber 21 and chamber 22 is interrupted.

After the aforenoted interruption of fluidic communication, the hydraulic pressure within chamber 21 acts upon the pressure receiving area A3 toward the right, however, on the other hand, the hydraulic pressure within chamber 22 acts upon the annular pressure receiving area A3–A1 toward the left and still further, the hydraulic pressure within chamber 38 also acts upon the pressure receiving area A2 toward the left. The respective pressures acting upon the three pistons are brought into equilibrium according to the following formula, it being noted that the force of the spring 18 has been omitted for the purpose of simply clarifying the equilibrium or proportioning of the hydraulic pressures:

$$P1A3 = P2(A3 - A1) + P1A2 \tag{1}$$

wherein P1=the hydraulic pressure within the master cylinder, P2=the hydraulic pressure within the rear wheel brakes.

The formula (1) may be further modified as follows:

$$P1(A3-A2) = P2(A3-A1) \quad (2)$$

which leads to $$P1/P2 = (A3-A1)/(A3-A2) \quad (3)$$

and because $A2 > A1$, $(A3-A2) < (A3-A1)$, and accordingly, $P1 > P2$.

In other words, the rear-wheel-brake hydraulic pressure P2 is lower than the master-cylinder pressure P1 within chamber 21.

If the pressure build-up is continued, with the valve 12 maintained closed by means of the valve 12 being disposed within the aforenoted manner, then the piston 9 will move a minute distance toward the right according to formula (3). This opens the valve 12 so as to permit the flow of oil from chamber 21 into chamber 22 in a very small amount, and consequently, pressure will be built-up within chamber 22 to some extent immediately thereafter. However, valve 12 will be immediately forced back against valve seat 13, providing the relationship represented by formula (3), and such a cycle will be repeated with a small frequency, whereby a pressure build-up within the rear wheel brakes 4 will be controlled as shown by means of the dotted line of FIG. 1a, as long as the pedal is being depressed.

The description will now proceed with the operation of the alarm means. In the event of failure of the front-wheel brake system, if the master cylinder is actuated, the pressure within chamber 38 will be decreased to atmospheric pressure. As a result, the three pistons will move toward the right in an integral manner due to the abnormal hydraulic pressure within chamber 22 which is fluidically communicated with the master cylinder, and the aforenoted hydraulic pressure within chamber 21 acts upon the pressure receiving area A1. As a result, the plunger 50 which has been in engagement with the tapered groove 39 within piston 8, will move upwardly such that the upper end of plunger 50 will abut contact 43 thereby closing the alarm circuit so as to illuminate the lamp 48 indicating the alarm. In this case, the P-valve 11 remains open, and high pressure fluid is supplied to the rear wheels, without being controlled or limited, and this compensates for the lost braking force of the front wheel brakes due to the failure of the same.

In the event of failure of the input-side circuit of the P-valve 11 within the rear wheel brake system, or in the event of failure of the output-side circuit thereof, the three pistons move in an integral fashion toward the left due to the hydraulic pressure within chamber 38 being in communication with the front wheel brake system, which hydraulic pressure acts upon the pressure receiving area A2. As a result, the alarm circuit will be closed in the same manner as has been described hereinabove. At this time, the valve 12 is forced through the valve seat 13 toward the left such that the elongated hole 27 within piston 25 goes beyond lip 29, with the left end of the elongated hole 27 exposed with chamber 38. Accordingly, both chambers 37 and 38 are maintained in communication from the initial stage of braking, and as a result, hydraulic pressure within the front wheel brakes is built up along the A–D–E, without following the delay path of A–B within the graph of FIG. 1a. In other words, the valve 30 terminates the actuation of the metering valve such that the front wheel brakes are actuated without experiencing a delay from the initial stage of braking, and thus, the braking operation is commenced without a delay despite the failure of the rear wheel brakes, thus ensuring safety. In this case as well, the plunger 50 is operated so as to indicate an alarm condition.

Figure 1B:
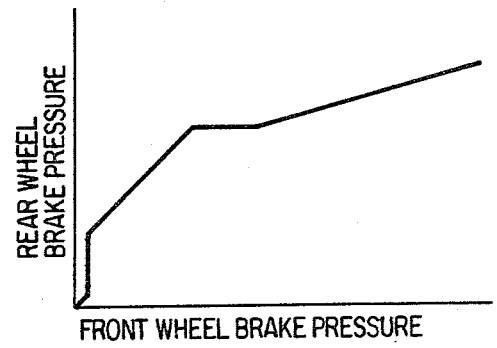
Figure 1A:
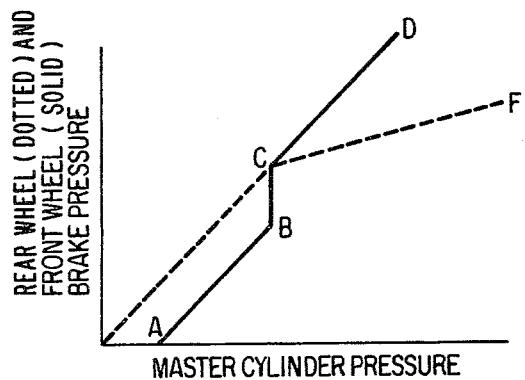
Figure 1B:
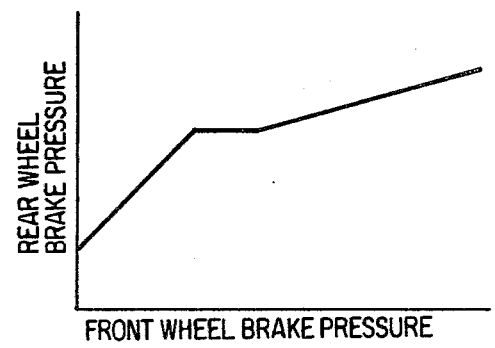

FIG. 1b gives a substantially ideal curve representing the relationship between the front-wheel brake hydraulic pressure and the rear-wheel-brake hydraulic pressure, and it is to be noted that if piston 25, within the embodiment of FIG. 1, is modified into a piston free of the elongated hole 26, then its performance curve will be such as shown within FIGS. 1aa and 1bb.

Figure 2A:
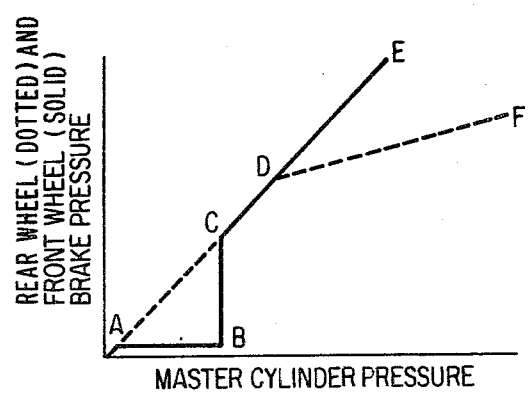
FIGS. 2a and 2b are performance curves of the embodiment of FIG. 2.
Figure 2B:
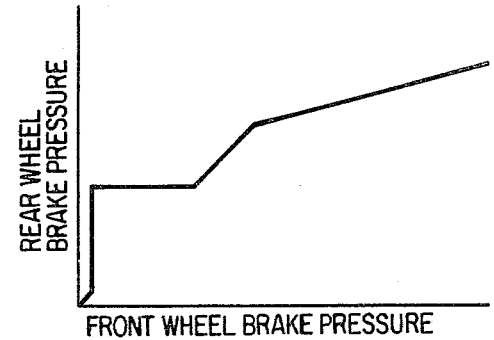
Figure 2:
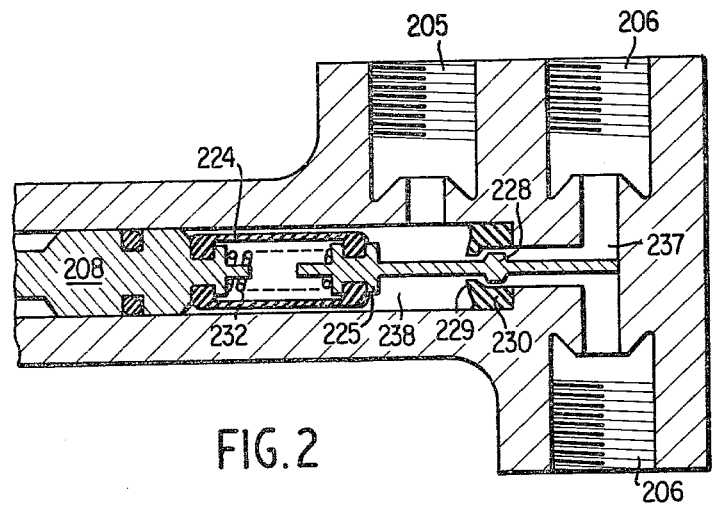
FIG. 2 is a partial view, similar to that of FIG. 1, showing however, a second embodiment of the present invention.

With reference now being made to FIG. 2, a description will be given with respect to the metering valve portion of the system, wherein the parts thereof are similar to the parts within FIG. 1 but have been given reference numerals within a 200 series with the last figures remaining unchanged. More particularly, confined between pistons 208 and 225 is a compression spring 232 which is disposed within a seal 224 interconnecting pistons 208 and 225. A sealing portion 228 of piston 225 is loosely fitted within valve 230, and the condition shown represents the brake in its rest position.

Hydraulic pressure supplied from the master cylinder through means of an inlet 205 enters a chamber 238 and is conducted past the sealing portion 228 disposed in the open condition, and then through a chamber 237 and an outlet 206, and into the front wheel brakes. The performance curve of this embodiment will be such as shown within FIGS. 2a, and 2b, and the relationship between the front-wheel-brake hydraulic pressure and the master-cylinder hydraulic pressure is shown by means of the solid line within FIG. 2a, while the relationship between the rear-wheel-brake hydraulic pressure and the master-cylinder hydraulic pressure is shown by means of the dotted line within FIG. 2a.

Up to the point A within FIG. 2a, the hydraulic pressure from the master cylinder is applied to the front wheel brakes intact, and at the point A, the sealing portion 228 engages lip 229 such that the front wheel brakes are fluidically disconnected from the master cylinder. Within the range from point A to point B, the aforenoted terminated condition is continued, and consequently, even if the master-cylinder hydraulic pressure is built-up, the pressure within the front wheel brakes will not be correspondingly increased. Thereafter, the pressure within the rear wheel brakes is built-up as shown by means of the dotted line, with an increase in the hydraulic pressure within the master cylinder such that the brake shoes contact the drum surface of the rear-wheel drum brakes, a braking force thus beginning to be exerted at point B. Accordingly, the wheel cylinder within the disc brake upon the side of the front wheel effects a braking action, such being delayed, for a time period corresponding to the distance A–B, by means of the metering valve.

At point B, the sealing portion 228 of piston 225 is forced through lip 229 in the left direction, and as a result, the master cylinder will be brought into direct communication with the front wheel brakes whereby the front-wheel-brake hydraulic pressure is built-up in the manner denoted by the line CDE of FIG. 2a. Meanwhile, at point D, the P-valve, which is not shown herein, begins controlling the hydraulic pressure to the rear wheel brakes, and the dotted line DF represents the variation in hydraulic pressure within the rear wheel brakes, the P-valve being of the same construction as that of FIG. 1, and thus, a detailed description of the same is omitted. FIG. 2b shows a substantially ideal curve representing the relationship between the hydraulic pressures within the front and rear wheel brakes.

Figure 3:
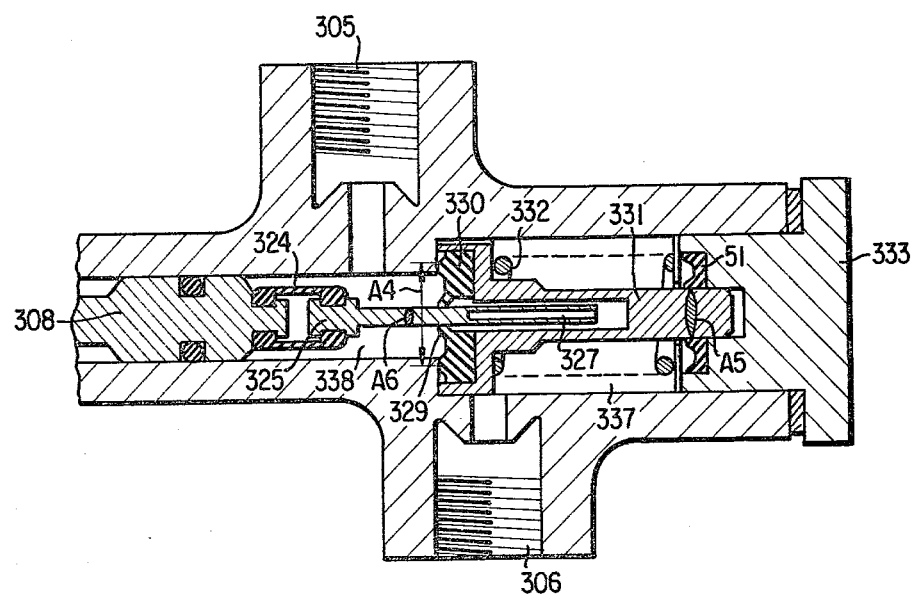
FIG. 3 is a view similar to that of FIG. 2, showing however a third embodiment of the present invention.

A description will now be given of the embodiment of FIG. 3, wherein the component parts are similar to those of FIG. 1 and are simply designated with reference numerals of the 300 series with the last figures remaining unchanged. The difference between this embodiment and the embodiments of FIGS. 1 and 2 is that the retainer 331 extends toward the right so as to have the right end thereof engaged within a blind recess of a plug 333. The sealing area of a seat 330, that is, the area defined by an annular build-up portion upon the valve 330 is designated A4, and the cross-sectional area of the piston 331 is designated A5, a description of the P-valve and the alarm means being omitted due to the fact that their constructions are similar to those shown within FIG. 1.

In the rest condition as shown, if the hydraulic pressure is supplied through inlet 305, then the seal 324 is collapsed under the influence of the hydraulic pressure within chamber 338, and consequently, piston 325 is moved to some extent toward the left, the left end of elongated hole 327 not going beyond lip 329 into chamber 338. Thus, chamber 338 is maintained blocked from chamber 337 during which time the hydraulic pressure within chamber 337 will not be built-up even if the hydraulic pressure within chamber 338 is built up, and this condition continues up to the point A of the performance curve of FIG. 3a.

Furthermore, when the hydraulic pressure within chamber 338 continues building up, then the sealing area A4 of valve 330 receives the hydraulic pressure from chamber 338 so as to overcome the biasing force of spring 332 thus opening valve 330. This causes oil to be transferred from chamber 338 to chamber 337 in a predetermined amount whereby the hydraulic pressure will be built up within chamber 337. As a result, the sum of the forces of spring 332 and the hydraulic pressure within chamber 337 is brought into equilibrium with the hydraulic pressure within chamber 338, and consequently, valve 330 is moved to its closed position as shown. The relationship between the respective hydraulic pressures P1 and P2 within both chambers 337 and 338, which act upon the opposite sides of the valve 330, is given as follows:

$$P1 \times (A4 - A6) = P2 \times (A4 - A5),$$

which may be modified into $$P1/P2 = (A4 - A5)/(A4 - A6)$$

and as $$(A4 - A6) > (A4 - A5), P1 < P2.$$

In this respect, examination has been concerned with the equilibrium of the hydraulic pressures wherein the force of spring 332 has been neglected.

The opening and closing cyclic operation of the valve 330 will continue during the time corresponding to the distance A–B of FIG. 3a, or in other words, during the time corresponding to the distance A–B, the rate of the pressure build-up within chamber 337, that is, within the front wheel brakes, is greater than the rate of the pressure build-up within chamber 338, because of the ratio of the aforenoted pressure receiving areas. As a result, the line between points A and B inclines steeply, such, for example, being greater than an angle of 45°. Thus, the hydraulic pressure within chamber 337 rapidly attains the pressure level of point A, after being delayed, so as to reach the hydraulic pressure level within the master cylinder.

At point B, the left end of the elongated hole 327 is exposed within chamber 338 thus bringing both chambers 338 and 337 into communication. Thereafter, the input hydraulic pressure at inlet 305, and the hydraulic pressure at outlet 306, will be built up following the line B–C–D, the same pressure level being maintained.

Meanwhile, at a predetermined time after the output hydraulic pressure has reached the point B, the P-valve, not shown, begins controlling the operation at point C, and FIG. 3a shows, by means of the dotted line, the resulting hydraulic pressure within the rear wheel brakes.

Within this embodiment, in the event of failure of the rear wheel brake system, which causes an abnormal pressure drop therein, pistons 308 and 325 move toward the left giving an alarm in the same manner as in the first embodiment. The leftward movement of the pistons 308 and 325 causes the elongated hole 327 to facilitate communication between both chambers 337 and 338 from the initial stage of braking, thereby interrupting the actuation of the metering valve, and accordingly, even if the rear wheel brakes are inoperable, braking may be effected for the front wheels from the initial stage of braking, thus insuring safety.

FIG. 3b shows the relationship between both hydraulic pressures upon the sides of the front wheels and the rear wheels, during the aforenoted operation, FIG. 3b giving a substantially ideal curve. In this embodiment, the respective pressure receiving areas A4, A5, and A6 are suitably selected so as to result in a small gradient for the distance B–C, and consequently, while points B and C are shown apart from each other within FIG. 3a, they may be coincident with each other, and FIG. 3a' shows the relationship between the respective hydraulic pressures within the front and rear wheel brakes, in such case.

According to the performance curve shown within FIG. 3a" of this embodiment, unlike the case of FIG. 3a, the actuation of P-valve is commenced, and both chambers 338 and 337 are brought into communication with each other by means of the elongated hole without resorting to the recovery of the delay of the front-wheel-brake hydraulic pressure according to the opening and closing operations of the valve 330. In this case, FIG. 3b" shows the relationship between the respective brake hydraulic pressures within the front and rear wheels.

Referring now to FIG. 4, there is shown another embodiment of the present invention wherein the component parts are similar to those of FIG. 1 and have been designated with reference numerals of the 400 series, with the last figures remaining unchanged. A piston 409 corresponds to a combination of the pistons 9 and 8 shown within the embodiment of FIG. 1, and the difference between the present embodiment and that of FIG. 1 is that the sliding portion of piston 409, which is to the right of valve 412, has a uniform cross-sectional area A9. In addition, the left end portion of piston 409 is disposed within a blind recess 61 formed within a plug 414, and the cross-sectional area of the left end portion of the piston 409 is designated A11.

A weak compression spring 62 is supported at one end thereof by means of a valve 413, and at the other end thereof by means of a retaining ring 63 fixed within a sleeve 417. A retainer 419 is supported by means of the retaining ring 63, and one end of a compression spring 418 is supported by means of a flanged end of sleeve 417 while the other end thereof is supported by means of the retainer 419 whereby the spring 418 is confined as shown within FIG. 4, which shows the rest position. In addition, the retainer 419 abuts an annular flange 64 of piston 409, thus limiting the movement of piston 409 as shown, and a stem 65 of piston 409, which is positioned upon the right end thereof, has its head 66 loosely disposed within a recessed chamber of piston 425.

When the piston 409 moves toward the left, the head 66 abuts a retaining ring 67 of piston 425 so as to likewise move valve portion 76 of piston 425 toward the left. The right end of piston 425 is disposed within a blind recess 68 formed within a plug 433, and a flange 69 of piston 425 supports one end of a compression spring 70 while the other end of spring 70 is supported by means of an annular retainer 71. An annular valve 72 disposed upon portion 76 receives one end of another spring 73, while the other end of spring 73 is supported by means of a shoulder portion of the body 1.

Spring 73 is weaker than spring 70, and piston 425 is supported within recess 68 and retained in such position, as shown, by means of both springs 70 and 73, such condition being the rest condition. A valve 430 is biased against a valve face or seat 430 by means of a compression spring 432 through the medium of a retainer 431, and the retainer 431 has a radial flange 74 loosely interposed between flange 69 and a retaining ring 75 of piston 425.

A description will now be given of the operation of this embodiment, the respective parts being shown in the rest condition. When the brake pedal is depressed, hydraulic pressure from the master cylinder M is introduced through inlet 402 into chamber 421, past the P-valve 411, through the chamber 422 and the outlet 403, and then into the rear wheel brakes 404. On the other hand, the hydraulic pressure to be fed into the front wheel brakes is first introduced through means of inlet 405 and into chamber 438, so as to then be transmitted between the valve 72 of the valve portion 76 and the valve 430, into chamber 437, and ultimately to outlet 406 and into the front wheel brakes 407.

The piston 425 is moved against the biasing force of spring 70, due to the hydraulic pressure within chambers 438 and 437 which act upon the pressure receiving area A7, until the retaining ring 75 abuts the flange 74, whereupon the valve 72 is in contact with valve 430. Thereafter, chamber 438 is fluidically separated from chamber 437, and consequently, when the pressure is built-up within chamber 438, the pressure within chamber 437 will not be correspondingly built-up, and this condition is represented by means of the solid line extending from point A to point B within FIG. 4a.

When the hydraulic pressure within chamber 438 is built-up to point B, then the hydraulic pressure within chamber 438, which acts upon the average sealing area A8 of valve 430, overcomes the biasing forces of springs 432 and 70, as well as the hydraulic pressure within chamber 437, and consequently, valve 430 is disengaged from valve seat 436 and moved to its open position. This causes a small amount of oil to flow from chamber 438 into chamber 437, thereby building up the pressure within chamber 437, however, substantially instantaneously therewith, the relationship of the hydraulic pressures within both chambers will return to the condition prior to the open position of valve 430, and consequently, valve 430 returns to its closed position. The relationship between the hydraulic pressure P1 within chamber 438 and the hydraulic pressure P3 within chamber 437, immediately before the opening of the valve is given as follows:

$$P1 \times A8 \approx P3(A8 - A7) \tag{4}$$

In this respect, as in the preceeding cases, the force of the spring has been omitted from the consideration in order to simplify the same. In other words, when the equilibrium of formula (4) is lost due to the continuing build-up of pressure within chamber 438, then the valve 430 assumes its open position. This returns the relationship of the hydraulic pressures within both chambers to the relationship represented by formula (4), whereupon the valve 430 assumes its closed position. As long as the pressure build-up is continued within chamber 438, the opening and closing cyclic operation of the valve 430 is repeated with a small frequency, while the hydraulic pressure at outlet 406 is built-up. It is noted that the rate of pressure build-up within chamber 437 is greater than that within chamber 438, in proportion to the ratio of the pressure receiving areas A8/(A8-A7), and the aforenoted operation is represented by means of the solid line B–C within FIG. 4a. Meanwhile, it is additionally noted that during the above operation, the valve 72 continues to be seated or in contact with valve 430.

When the pressure reaches point C, then the force of the piston 425 being biased toward the right by means of the hydraulic pressure within chamber 438, which acts upon the pressure receiving area A7, overcomes the biasing force of spring 432 whereby the valve 72 biases the valve 430 toward the right so as to maintain valve 430 in its open position against the biasing force of spring 432. In other words, both chambers 438 and 437 remain in fluidic communication with each other, or stated otherwise, the hydraulic pressure within the master cylinder is directly transmitted to the front wheels, this condition being represented by the line C–D–E of FIG. 4a. When the pressure reaches point D, the P-valve 411 begins its controlling operation so as to control the hydraulic pressure being fed to the rear wheel brakes, and this condition is shown by means of the dotted line within FIG. 4a. A description will now be given of the operation of the P-valve.

When the pressure reaches point D, then the piston 409 is biased toward the left against the biasing force of spring 418 due to the hydraulic pressure within chamber 438 which acts upon the pressure receiving area A9 whereby the valve 412 will be seated upon the valve seat 413. The sealing area of the valve seat 413 is assumed to be A10, and consequently, the relationship of the hydraulic pressures acting upon the piston 409 is given as follows:

$$P1 \times (A10 - A11) = P4 \times (A10 - A9) + P1 \times A9 \tag{5}$$

wherein P4 represents the hydraulic pressure within chamber 422 and being conducted to the rear wheel brakes.

Formula (5) may be modified further into the following:

$$P4/P1 = (A10 - A11)/(A10 - A9) \tag{6}$$

and it can be seen from formula (6) that the performance curve of the rear wheels after point D of FIG. 4a is directed downwards. The description has of course omitted the biasing force of the spring as in the preceding cases.

When the pressure build-up within chambers 421 and 438 continues and thus the equilibrium or proportion represented by formula (5) is lost, then the P-valve assumes its open position whereby a small amount of oil is transferred from chamber 421 to chamber 422, thus bringing about the condition prior to the opening of the P-valve, whereby the valve 411 is brought to its closed position. Thereafter, as long as the pressure build-up within chambers 421 and 438 continues, an opening and closing cyclic operation is repeated, while the pressure within the rear wheel brakes 404 is built-up. The operation is similar to that of the metering valve which has been described earlier, so that further description may be omitted herefrom, and the relationship of hydraulic pressures within the respective front wheel and rear wheel brakes will be such as shown within FIG. 1b, during the aforenoted operation.

In the event of a failure of the rear wheel brake system with an accompanying pressure drop, then the system equilibrium or proportion is lost and the piston 409 is biased toward the left to a substantial extent whereby lamp 448 will be illuminated as in the preceding embodiments, thus indicating an alarm. At the same time, the valve portion 76 is moved toward the left by means of the retaining ring 67 engaging head 66 of the piston stem, and consequently, valve 72 is maintained in its open position. Accordingly, the hydraulic pressure within the master cylinder acts directly upon the front wheel brakes 407 from the initial stage of braking, thus compensating for the lost braking force of the rear wheel drum brakes which are inoperable at the initial stage of braking, thereby insuring safety.

In the event of a failure within the front wheel brake system, the piston 409 moves toward the right, and an alarm is indicated while the P-valve 411 remains in its open position. Accordingly, high hydraulic pressure is supplied to the rear wheel brakes, without being controlled, thus compensating for the lost braking force of the front wheel brakes.

FIGS. 4a' and 4b' show the performance curves, within which the gradient of the line B-C is varied by varying the pressure receiving areas and the ratio in the length of the springs, in an attempt to bring the two points C and D into coincidence, and FIGS. 4a" and 4b" show the performance curves, within which recovery of the delay of the hydraulic pressure within the front wheel brakes is effected simultaneously with the commencement of the actuation of the P-valve. These Figures show examples, wherein the head 66 of the stem at its right end is disengaged from the valve portion 76 in accordance with the action of the P-valve, and in case the head 66 need not be disengaged from the valve portion 76 in accordance with the movement of the piston 409, the ordinary metering valve action is possible.

The description will now proceed with the embodiment shown within FIG. 5, and it is seen that the construction of the metering valve is identical to that of the embodiment of FIG. 4, the parts corresponding to those having designated reference numerals within the 400 series within FIG. 4 being given the reference numerals within the 500 series with the last two figures remaining unchanged.

A stem 565 has its head 566 disposed within a blind recess chamber of piston 525 of the metering valve, and the stem 565 extends rightwardly from a differential-pressure piston 80. The piston 80 is formed with a shoulder portion 81, which engages a shoulder 82 formed upon the inner peripheral surface of the body 1, so as to be retained in the position as shown, and defined to the left of the differential pressure piston 80 is a chamber 83 into which the master cylinder pressure is introduced through means of an inlet 502, while an outlet 521 is fluidically communicated with the rear wheel brakes 504.

The hydraulic pressure acting upon the larger pressure receiving area of piston 80 within chamber 83 overcomes the hydraulic pressure acting upon the small pressure receiving area of piston 80 within chamber 538, thereby biasing the piston 80 toward the right, however the movement of piston 80 is terminated due to shoulder 81 abutting shoulder 82, as shown.

In the event of a failure of the rear wheel brake system, the pressure within the chamber 83 is decreased whereby piston 80 will be biased toward the left due to the hydraulic pressure within chamber 538. As a result, the head 566 of the stem 565 of piston 80 will engage the retaining ring 567 so as to maintain the valve 572 and the valve 530 in the relative open condition. Thus, piston 525 ceases to function as a metering valve, and the hydraulic pressure is directly supplied from the master cylinder M to the front wheel brakes 507. As a result, the front wheel brakes are operated from the initial stage of braking without delay thus compensating for a delay in starting the brake action due to the failure of the rear wheel brakes, and thus, such insures safety.

As is apparent from the foregoing description of the respective embodiments, with the metering valve device constructed in accordance with the present invention, the operation of the device as a metering valve is immediately interrupted in the event of a failure of the rear wheel brake system so that pressure oil is supplied to the front wheel brakes from the initial stage of braking without delay, whereby an insufficient braking force of the rear wheel brakes is compensated for, thus insuring safety.

In additon, the combination of the alarming means with the P-valve that is, a braking-hydraulic-pressure control means, permits the common use of parts of the respective valve, thus providing a compact and simple construction.

Figure 6:
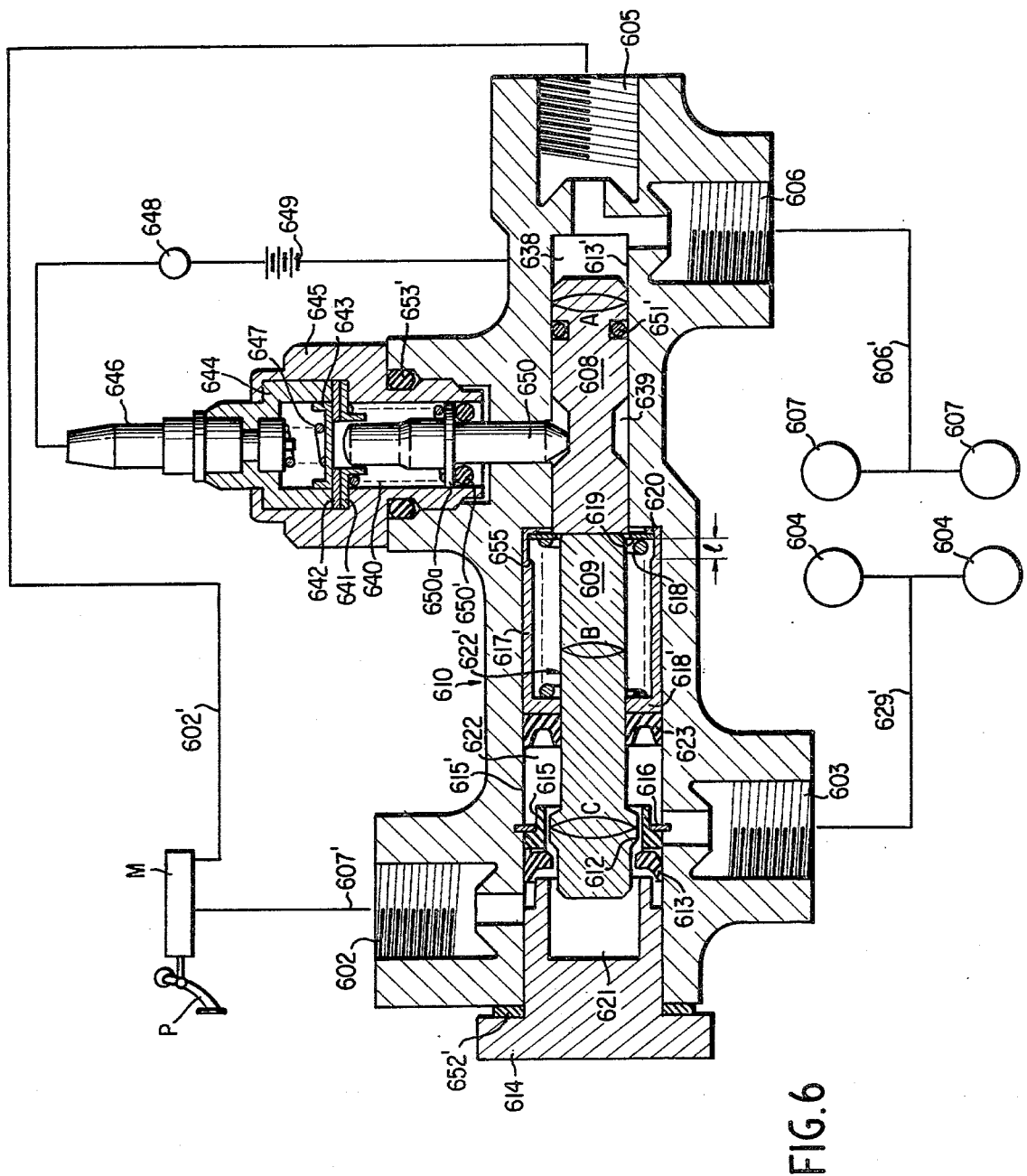
FIG. 6 is a view similar to that of FIG. 1, showing however, a sixth embodiment of the present invention.

Referring now to FIG. 6, hydraulic pressure from a brake master cylinder M is introduced through means of a conduit 602' into an inlet 605 of a body or housing, generally indicated by the reference character 610, and is transmitted to an outlet 606, and through means of a pipe 606' into the brake wheel cylinders of front wheels 607 so as to thereby brake the front wheels. Another conduit 607' is also connected to the master cylinder M and to an inlet 602 of the body 610, and in this manner, the hydraulic pressure which has been introduced into the inlet 602 is able to be supplied, by means of a control mechanism to be described later, through an outlet 603, and through means of a conduit 629' into the rear wheels 604.

A first piston 608 is slidably disposed within a first cylinder 613' located within the right end portion of the body 610, and a second cylinder 615' is provided in contiguous relation to, but to the left of the first cylinder 613', so as to be coaxial therewith. A sleeve 617 is disposed within the second cylinder 615', and a compression spring 618 is housed within sleeve 617. The left end of spring 618 is retained by means of an annular flange 618' of sleeve 617 while the right end of spring 618 is retained by means of an annular flange 620 of sleeve 617 through means of a retainer 619.

Flange 620, as shown, is provided by bending a steel plate into the form of a flange within a press machine, however, this may be replaced by means of a snap ring, or the like. The sleeve 617 is retained in position when a cup seal 623 is subjected to hydraulic pressure within chamber 622, however, on the other hand, the sleeve 617 may be slidably moved within the second cylinder 615'. The retainer 619 engages the right end of the first piston 608 and compresses spring 618 by being slidably movable by means of the first piston 608.

Slidably disposed through the central opnening of the sleeve 617 is a small diameter portion 609 of the second piston 622' which is also formed with a large diameter portion or land 612 at a position close to the left end thereof. An annular retainer 615 is provided within second cylinder 615' in such a manner as to surround the outer periphery of the large diameter portion 612, and the rightward movement of retainer 615 is restricted by means of a snap ring 616. The retainer 615 supports a valve seat 613 whose leftward movement is similarly restricted by means of a plug 614 positioned to the left thereof, and this structure is well-known as a proportioning valve, although other valve mechanisms may be used in lieu thereof.

With the foregoing arrangement of the body 610, there is defined within the right end thereof a first chamber 638, a second intermediate chamber 639, the third chamber 622, and a fourth chamber 621, respectively, within the left end thereof. The first chamber 638 is fluidically communicated with the inlet 605 and outlet 606, and it is to be noted that while the first piston 608 is disclosed as being separate from the second piston 609, both pistons may be integral with the same results. In this case, however, design considerations should be given to the assembly of sleeve 617, retainer 619, and spring 618.

The outer peripheral surface of the first piston 608 is provided with a tapered groove 639 defining chamber 639' and within which is disposed the lower end portion of a plunger 650 which is formed with an annular flange 650a for supporting the lower end of a spring 640, plunger 650 being slidably movable through a body 649. The upper end of the spring 640 is supported by means of a retainer 641 which, along with a washer 642, is interposed between the lower end face of a holder 644 and an inner shoulder portion of the body 645.

A plug 646 is rigidly secured within holder 644 and the lower end of plug 646 serves to compress a spring 647 so as to bias a contact 643 of a disc form against the upper surface of washer 642. The contact 643 is vertically slidable within the holder 644, the latter of which is made of an electrically insulating material, such as, for instance, a synthetic resin, as is washer 642. Constituting an alarm electric circuit are plug 646, an illuminable lamp 648, an electric potential source 649, body 610, retainer 641, spring 640 plunger 650, contact 643, and spring 647, reference characters 650', 651', and 653' designating O-rings, while there is shown at 652' a gasket-type seal.

A description will now be given with respect to the operation of the embodiment disclosed within FIG. 6. When hydraulic pressure is generated due to the brake pedal P being depressed, the hydraulic pressure which has been introduced through means of conduit 602' into inlet 605 is fed through means of the first chamber 638, outlet 606, and conduit 606', into the brake wheel cylinders 607 within the front wheels, thereby braking the front wheels.

Hydraulic pressure is also transmitted from the master cylinder M, by means of a conduit 607', into inlet 602 and, through means of the interstice defined between the valve 613 and the right hand end of plug 614, into the fourth chamber 621, whereupon the same is conducted past the valve, which is disposed in its open position, and into the third chamber 622, and by means of outlet 603 and conduit 629', into the rear wheels 604. At this stage, the hydraulic pressures of equal values are applied both to the front wheel brakes 607 and to the rear wheel brakes 604 for braking, as hydraulic pressures of equal value are applied to the first chamber 638 and fourth chamber 621.

However, as the pressure receiving area A of the first piston 608 is larger than the pressure receiving area B of the small diameter portion of the second piston 622', the first piston 608 biases the second piston 622' toward the left whereby both pistons are moved somewhat toward the left against the biasing force of spring 618. When the hydraulic pressure being fed to the first 638 and the fourth 621 chambers continues to build up, then the large diameter valve portion 612 of the second piston 622 will engage the valve seat 613 so as to close the same, and after closure of the valve 612, the rear wheel brakes 604 are fluidically disconnected from the master cylinder. The sealing cross-sectional area C of the valve 612 is so designed as to be larger than the pressure receiving area A described earlier, or in other words, the relationship of the pressure receiving cross-sectional areas A, B, and C is as follows:

$$C>A>B.$$

As a result, after the closure of valve 612, the hydraulic pressure PW within the rear wheel brakes and the hydraulic pressure PM within the master cylinder are maintained under the following relationship:

$$PW (C-B)=PM (C-A)+F$$

where F represents the biasing force of spring 618. In other words, $$PW=(C-A)/(C-B)\times PM+F/(C-B) \qquad (a)$$

and since $(C-A)<(C-B)$, the hydraulic pressure within the rear wheel brakes after closure of valve 612 is controlled to a power pressure than the hydraulic pressure PM within the master cylinder, commensurate with the ratio of the pressure receiving areas, $$(C-A)/(C-B).$$

When the brake pedal is depressed, with the result of build-up in hydraulic pressure within the master cylinder, both pistons are returned toward the right, thereby causing the valve 612 to move to its open position. Thereafter, as long as the brake pedal is being depressed, the opening and closing cyclic operation of the valve 612 will continue whereby the braking hydraulic pressure PW within the rear wheel brakes is controlled to a level lower than that of the hydraulic pressure within the master cylinder. It is noted that the stroke of the first piston 608 under controlled operation is less than the length l, there being provided a shoulder stop 655 upon the inner peripheral surface of the sleeve 617 at the right end thereof.

When the front wheel brake hydraulic circuit fails during the braking operation, with the result of a pressure drop therewithin, then the hydraulic pressure within the first chamber 638 is lowered to atmospheric pressure, and due to such lowering of the pressure within the first chamber 638, both pistons are jointly moved toward the right according to the hydraulic pressures prevailing within the fourhth chamber 621 and the third chamber 622, until both pistons exceed the strokes resulting at the time of normal controlled operation, the aforenoted hydraulic pressure acting upon the pressure receiving area B of the small diameter portion 609 of the second piston 622'.

As a result, the tapered groove 639 within the first piston 608 biases the plunger 650 so as to move the same upwardly into contact with the contact 643 thereby closing the electric alarm circuit, and this causes the lamp 648 to be illuminated thereby indicting an alarm notifying the operator of the failure of the front wheel hydraulic circuit. Upon the occurrences of the aforenoted alarming operation, the second piston 622' moves toward the right thereby bringing the fourth chamber 621 and the chamber 622 into communication with each other whereby a hydraulic pressure from the master cylinder M is able to be supplied to the rear wheel brakes without being subjected to the control operation, and consequently, the insufficient braking force of the front wheel brakes may be compensated for.

Similarly, in the event of a failure of the hydraulic circuit for the rear wheel brakes 604, with the result of the lowering of the pressure to atmospheric then the pressures within the fourth chamber 621 and the third chamber 622 are released, and the hydraulic pressure within the first chamber 638, which is being exerted upon the first piston, encounters no resistance. As a result, the first piston 608 biases the sleeve 617 toward the left through means of the retainer 619 and spring 618, while also directly biasing the second piston 622' toward the left, and at such time, the spring 618 is not compressed. This is due to the fact that the cup 623 is not subjected to hydraulic pressure, and hence the spring may move freely to the left. During this operation, it is also noted that the large diameter portion 612 of the second piston 622' is forced toward the left through the valve seat 613 which is made of rubber.

In case dust or foreign matter is present within the interstice defined between the outer periphery of the large diameter portion 612 of the second piston 622' and the retainer 615, with the result that the communication of the fourth chamber 621 with the third chamber 622 is interrupted, thereby resulting in the absence of hydraulic pressure within the third chamber 622, then both pistons move jointly toward the right so as to indicate the alarm in accordance with the relationship between the large pressure receiving area C and the small pressure receiving area A.

On the other hand, in case both chambers 621 and 622 are brought into communication due to the failure of valve 612, then both pistons may possibly be moved toward the left to a substantial extent according to the relationship of the pressures being received. However, the retainer 619 for spring 618 abuts the shoulder stop 655, due to the fact that the cup 623 receives hydraulic pressure and is retained in position, and consequently, both pistons only move a distance less than the length l, and are stopped thereby, no alarm being issued.

Still further, in case hydraulic pressure leaks into the second chamber 639' due to a failure of cup seal 623, O-ring 651', or the like, then plunger 650 will be raised upwardly due to the sealing action of the O-ring 650', thus closing the electric circuit, thereby indicating the alarm.

Figure 7:
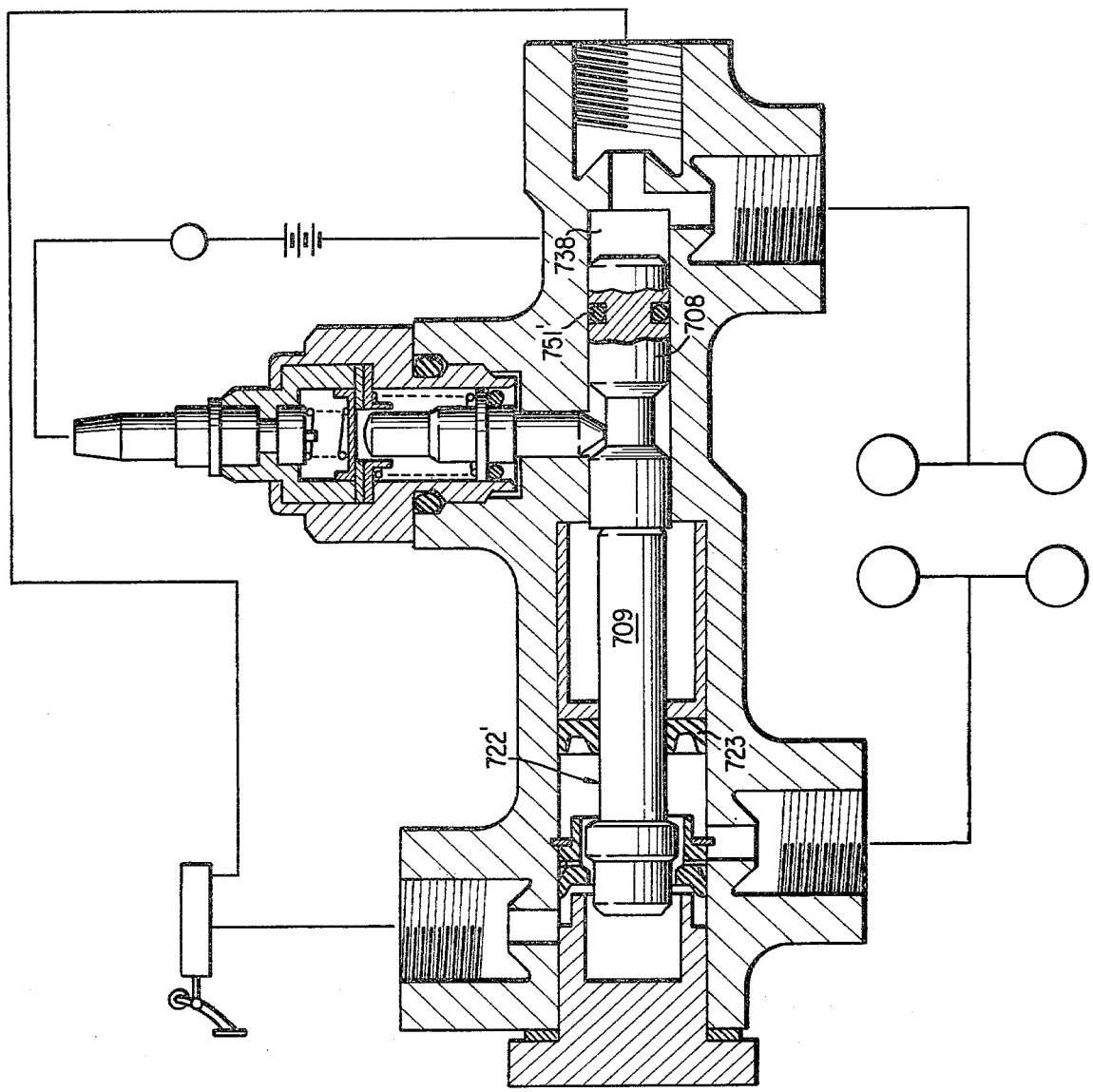
FIG. 7 is a view similar to that of FIG. 1, showing however, a seventh embodiment of the present invention.

The description will now continue with the embodiment shown within FIG. 7 which is devoid of spring 618, as compared with the embodiment disclosed within FIG. 6. For this reason, the difference in the pressure areas (A–B) between the first piston 708 and the second piston 722' is so designed as to be smaller than that of the first embodiment, and accordingly, the force of the spring 618 within the first embodiment is replaced by means of the resistances of cup seal 723 and O-ring seal 751'. When the hydraulic pressure acting upon the aforenoted difference in the pressure receiving areas (A–B) within chamber 738 overcomes the aforenoted resistances, then both pistons begin moving toward the left as viewed in the drawing, thus repeating the same operation as in the first embodiment, the provision of the aforenoted difference in the pressure receiving areas thus facilitating the utilization of the resistance of the seal and the elimination of spring 618.

Figure 8:
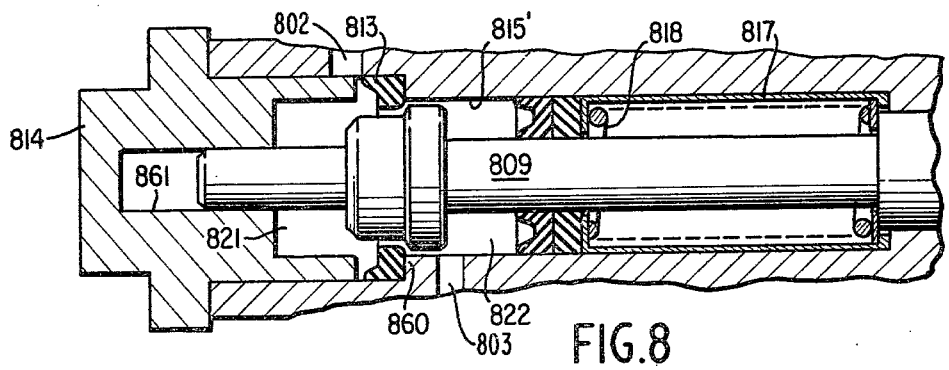
FIGS. 8–11 are partial views, similar to that of FIG. 6, showing however, additional embodiments of the present invention.

With particular reference now being made to the embodiment shown within FIG. 8, this embodiment avoids the use of the snap ring 616 of FIG. 6, and is so structured that a valve 813 is supported between a shoulder portion 860 defined upon the inner peripheral surface of the second cylinder 815, and the right end of a plug 814. In addition, the left end of the second piston 809 is slidably disposed within a blind recess 861 within plug 814. The feature of this embodiment resides in the sleeve 817 being free of a stop shoulder 655, as provided within the embodiment of FIG. 6, and as a result, even in case the fourth chamber 821 and the third chamber 822 are in fluidic communication with each other due to a failure of valve 813, both pistons may move a considerable distance toward the left thus indicating an alarm, unlike the embodiment of FIG. 6. An inlet 802 and outlet 803 are also provided in the housing.

Figure 9:
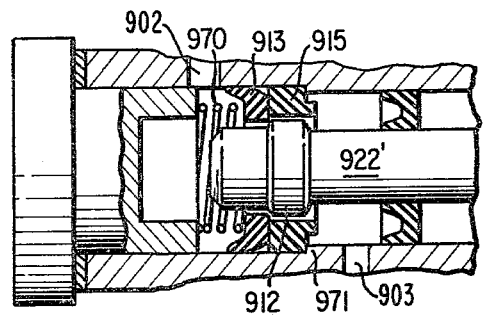

Within the embodiment of FIG. 9, when the second piston 922' moves toward the left so as to indicate an alarm, the large diameter valve portion 912 engages the valve seat 913 so as to likewise move the same toward the left, thereby compressing a very weak spring 970, and a retainer 915 abuts a shoulder portion 971 so as to be limited thereby in its rightward movement. An inlet 902 and outlet 903 are further provided in the housing.

Figure 10:
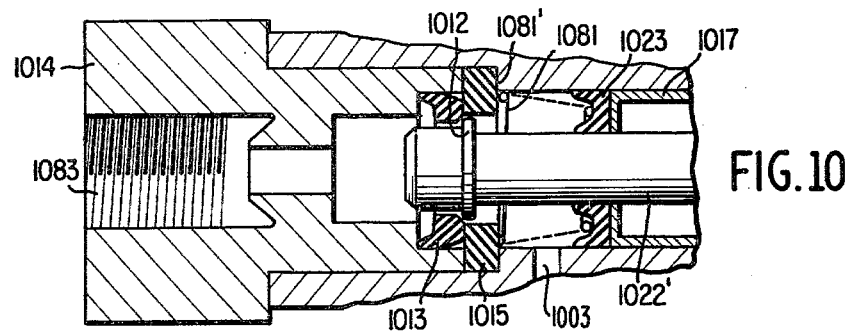

Considering the embodiment of FIG. 10, the large diameter valve portion 1012 is forced through the valve seat 1013, as in the cases of the first and second embodiments, while the cup seal 1023 is supported upon the sleeve 1017 with the aid of a weak spring 1081. A retainer 1015 is confined between the right end of plug 1014 and a shoulder portion 1081', and the plug 1014 is seen to have an inlet 1083. In addition, the width of the large diameter valve portion 1012 is narrow, so that even if solid foreign matter becomes interposed between the large diameter valve portion 1012 and the inner peripheral surface of the retainer 1015, slight movement of the second piston 1022' toward the right removes the foregin matter therefrom, thus preventing further difficulty. Still further, if the width of the retainer 1015 is narrowed as in the case of retainer 1115 within the embodiment of FIG. 11, there may result further improved advantages. An outlet 1003 is also provided in the housing.

Figure 11:
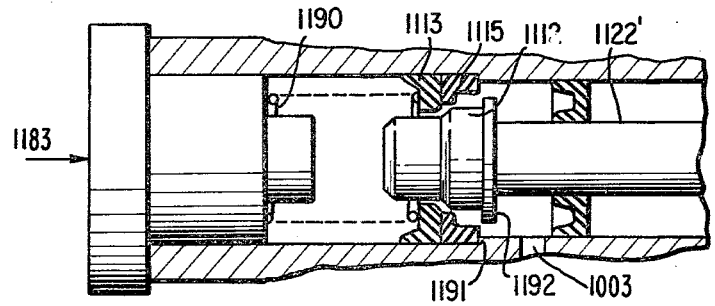

More particularly, with the embodiment of FIG. 11, valve seat 1113 is biased against retainer 1115 with the aid of a weak spring 1190, and the retainer 1115 abuts a shoulder portion 1191 so as to be retained thereat. A second piston 1122' is formed with a flange or guide 1192 for positively moving the valve seat 1113 toward the left and also biases the shoulder portion of retainer 1115 toward the left, thus indicating an alarm. An inlet 1183 and outlet 1103 are further provided as shown in FIG. 11.

As is apparent from the foregoing, according to the present invention, a single valve may serve the dual purposes as a braking hydraulic pressure control valve and a pressure-difference sensing valve. In addition, the entire construction of the control device is rendered compact in size, with an accompanying reduction in the space required for assembly, and a substantial reduction in cost.

The present invention not only achieves the aforenoted objects and advantages but also provides a wide range of applications according to various combinations. For instance, as has been described earlier, the mechanism of a proportioning valve may be easily modified into one wherein the valve is provided within a piston, or into another wherein a spherical valve provided within the cylinder portion may be opened or closed by means of the outer periphery of a piston.

In addition, even an arrangement which is devoid of an alarm switching portion permits the supply of hydraulic pressure from the master cylinder directly to the rear wheel brakes in the even of a failure of the front wheel hydraulic circuit. Still further, even in case the fourth chamber is shut off from the third chamber, the aforenoted supply of hydraulic pressure is insured.

Still yet further, as hydraulic pressure may be fed through means of conduit 7 into inlet 8, hydraulic pressure may be supplied to both inlets 3 and 8 from a single or common master cylinder, thereby achieving the same results as those of a known type proportioning valve. The valve according to the present invention allows alternative uses as a proportioning valve having a by-pass function in the event a failure of a front wheel hydraulic circuit and as a proportioning valve having a function to indicate an alarm in the event of a failure of the front wheel or rear wheel hydraulic circuit, and furthermore may cope with problems within the proportioning valve, as has been described earlier.

As is apparent from the foregoing, the control device according to the present invention may be used for various applications, providing interchangeability and simplicity in construction.

Obviously, many modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A hydraulic pressure control system for brakes for use within motor vehicles having a dual master brake cylinder and a first and second independent wheel brake line, comprising:

a housing having an axial bore defined therein;
   a first fluid chamber defined within said bore and fluidically connected to said master cylinder;
   a second fluid chamber defined within said bore and fluidically connected to a first wheel brake cylinder means of said vehicle, such that said master cylinder, said first and second chambers, and said first wheel brake cylinder means define said first brake line;
   pressure control valve means, including first stepped piston means and a valve member cooperable with said piston means, disposed within said first brake line and said first and second fluid chambers, for controlling fluidic communication between said first and second chambers and for limiting the fluid pressure transmitted from said master cylinder to said first brake line;
   a third fluid chamber defined within said bore and fluidically connected to said master cylinder and second wheel brake cylinder means of said vehicle, respectively, wherein said master cylinder, said third chamber and said second wheel brake cylinder means define said second brake line;
   said first stepped piston means including a first pressure receiving area for receiving hydraulic pressure from said second wheel brake line, and second and third pressure receiving areas for receiving hydraulic pressure from said first wheel brake line, said third area being larger than said first area which, in turn, is larger than said second area, said pressure fluids received upon said first and third pressure areas acting in opposite directions;
   said valve member being cooperable with said third area for performing said pressure control function;
   failure-warning means, operatively connected to said first stepped piston means to be actuated thereby, for indicating a failure within said first and second brake lines and;
   metering valve means, including second stepped piston means, disposed within said third chamber for delaying the transmission of the fluid pressure transmitted from said master cylinder to said second wheel brake cylinder means, a stem portion, integrally connected to said second stepped piston means, having an enlarged diameter sealing means, and valve means annularly disposed about said stem portion and cooperable with sealing means for controlling the fluidic communication between said master cylinder and said second wheel brake cylinder means;
   whereby said first stepped piston is axially movable within said bore to actuate said failure-warning means when said first and second brake lines are subjected to a fluidic failure, respectively, and said pressure control valve means is terminated and full master brake cylinder pressure is supplied to said first wheel brake cylinder means through said first brake line when said second brake line is subjected to a fluidic failure.

2. A pressure control system as set forth in claim 1, wherein:
   said first stepped piston means comprises two piston members and said first pressure receiving area is defined within one of said piston members while said second and third pressure receiving areas are defined within the other one of said piston members.

3. A pressure control system as set forth in claim 1, further comprising:

biasing means biasing said first stepped piston means against hydraulic pressure within said third chamber.

4. A pressure control system as set forth in claim 1, wherein:
said first and second stepped piston means are coaxially disposed with respect to each other and further comprising lost-motion means interconnecting said first and second stepped piston means, whereby metering operation of said metering valve means is terminated and full master brake cylinder pressure is supplied to said second wheel brake cylinder means when said first braking circuit is subjected to a fluidic failure.

5. A pressure control system as set forth in claim 4, wherein said metering valve means further comprises:
at least one elongated through-hole defined within said stem portion, and fluidically connectable with either or both said master cylinder and said second wheel brake cylinder means.

6. A pressure control system as set forth in claim 5, wherein
said at least one elongated through hole comprises a first and second elongated through-hole defined within said stem portion wherein said sealing means is interposed between said through-holes and integral with said stem portion, said first and second through-holes being fluidically connected to said master cylinder and said second wheel brake cylinder means; and wherein
said valve means annularly disposed about said stem portion is cooperable with said sealing means and said throughholes for controlling fluidic communication between said through-holes and said master cylinder and said second wheel brake cylinder means.

7. A hydraulic pressure control system for brakes for use within motor vehicles having a dual master brake cylinder and a first and second independent wheel brake line, comprising:
a housing having an axial bore defined therein:
a first fluid chamber defined within said bore and fluidically connected to said master cylinder;
a second fluid chamber defined within said bore and fluidically connected to a first wheel brake cylinder means of said vehicle, such that said master cylinder, said first and second chambers, and said first wheel brake cylinder means define said first brake line;
pressure control valve means, including first stepped piston means and a valve member cooperable with said piston means, disposed within said first brake line and said first and second fluid chambers, for controlling fluidic communication between said first and second chambers and for limiting the fluid pressure transmitted from said master cylinder to said first brake line;
a third fluid chamber defined within said bore and fluidically connected to said master cylinder and second wheel brake cylinder means of said vehicle, respectively, wherein said master cylinder, said third chamber and said second wheel brake cylinder means define said second brake line;
said first stepped piston means including a first pressure receiving area for receiving hydraulic pressure from said second wheel brake line, and second and third pressure receiving areas for receiving hydraulic pressure from said first wheel brake line, said third area being larger than said first which, in turn, is larger than said second area, said pressure fluids received upon said first and third pressure areas acting in opposite directions;
said valve member being cooperable with said third area for performing said pressure control function;
failure-warning means, operatively connected to said first stepped piston means to be actuated thereby, for indicating a failure within said first and second brake lines and
a plug member mounted in said housing adjacent said third fluid chamber and retainer means interposed between said plug member and said valve means;
whereby said first stepped piston is axially movable within said bore to actuate said failure-warning means when said first and second brake lines are subjected to a fluidic failure, respectively, and said pressure control valve means is terminated and full master brake cylinder pressure is supplied to said first wheel brake cylinder means through said first brake line when said second brake line is subjected to a fluidic failure.

8. A hydraulic pressure control system for brakes for use within motor vehicles having a dual master brake cylinder and first and second independent wheel brake lines, comprising:
a housing having an axial bore defined therein;
a first fluid chamber defined within said bore and fluidically connected to said master cylinder and to a first wheel brake cylinder means of said vehicle such that said master cylinder, said first chamber and said first wheel brake cylinder means define said first wheel brake line;
a first stepped differential-pressure piston disposed within said axial bore;
a second chamber defined within said bore fluidically connected to said master cylinder and a second wheel brake cylinder means of said vehicle such that said master cylinder, said second chamber and said second wheel brake cylinder means define said second brake line; and
metering valve means, including second stepped piston means, disposed within said second chamber for delaying the transmission of the fluid pressure transmitted from said master cylinder to said second wheel brake cylinder means, a stem portion integrally connected to said second stepped piston means, having an enlarged diameter sealing means and valve means annularly disposed about said stem portion and cooperable with said sealing means for controlling the fluidic communication between said master cylinder and said second wheel brake cylinder means.

9. A hydraulic pressure control system for brakes for use within motor vehicles having a dual master brake cylinder and first and second independent wheel brake line, comprising:
a housing having an axial bore defined therein;
a first fluid chamber defined within said bore and fluidically connected to said master cylinder;
a second fluid chamber defined within said bore and fluidically connected to a first wheel brake cylinder means of said vehicle, such that said master cylinder, said first and second chambers, and said first wheel brake cylinder means define said first brake line;
pressure control valve means, including first stepped piston means, a valve member cooperable with said piston means, disposed within said first brake line and said first and second fluid chambers, for controlling fluidic communication between said first and second chambers and for limiting the fluid pressure transmitted from said master cylinder to said first brake line, a ring member disposed within said axial bore and a retaining ring engageable with said ring member;

a third fluid chamber defined within said bore and fluidically connected to said master cylinder and second wheel brake cylinder means of said vehicle, respectively, wherein said master cylinder, said third chamber and said second wheel brake cylinder means define said second brake line;

said first stepped piston means including a first pressure receiving area for receiving hydraulic pressure from said second wheel brake line, and second and third pressure receiving areas for receiving hydraulic pressure from said first wheel brake line, said third area being larger than said first which, in turn, is larger than said second area, said pressure fluid received upon said first and third pressure areas acting in opposite directions;

said valve member cooperable with said third area for performing said pressure control function; and failure-warning means, operatively connected to said first stepped piston means to be actuated thereby, for indicating a failure within said first and second brake lines;

whereby said first stepped piston is axially movable within said bore to actuate said failure-warning means when said first and second brake lines are subjected to a fluidic failure, respectively, and said pressure control valve means is terminated and full master brake cylinder pressure is supplied to said first wheel brake cylinder means through said first brake line when said second brake line is subjected to a fluidic failure.

10. A hydraulic pressure control system for brakes for use within motor vehicles having a dual master brake cylinder and a first and second independent wheel brake line, comprising:

a housing having an axial bore and shoulder portion defined therein;

a first fluid chamber defined within said bore and fluidically connected to said master cylinder;

a second fluid chamber defined within said bore and fluidically connected to a first wheel brake cylinder means of said vehicle, such that said master cylinder, said first and second chambers, and said first wheel brake cylinder means define said first brake line;

pressure control valve means, including first stepped piston means and a valve member supported in said shoulder portion cooperable with said piston means, disposed within said first brake line and said first and second fluid chambers, for controlling fluidic communication between said first and second chambers and for limiting the fluid pressure transmitted from said master cylinder to said first brake line;

a third fluid chamber defined within said bore and fluidically connected to said master cylinder and second wheel brake cylinder means of said vehicle, respectively, wherein said master cylinder, said third chamber and said second wheel brake cylinder means define said second brake line;

said first stepped piston means including a first pressure receiving area for receiving hydraulic pressure from said second wheel brake line, and second and third pressure receiving areas for receiving hydraulic pressure from said first wheel brake line, said third area being larger than said first area which, in turn, is larger than said second area, said pressure fluids received upon said first and third pressure areas acting in opposite directions;

said valve member cooperable with said third area for performing said pressure control function; and failure-warning means, operatively connected to said first stepped piston means to be actuated thereby, for indicating a failure within said first and second brake lines;

whereby said first stepped piston is axially movable within said bore to actuate said failure-warning means when said first and second brake lines are subjected to a fluidic failure, respectively, and said pressure control valve means is terminated and full master brake cylinder pressure is supplied to said first wheel brake cylinder means through said first brake line when said second brake line is subjected to a fluidic failure.

11. A hydraulic pressure control system for brakes for use within motor vehicles having a dual master brake cylinder and a first and second independent wheel brake line, comprising:

a housing having an axial bore and shoulder portion defined therein;

a first fluid chamber defined within said bore and fluidically connected to said master cylinder;

a second fluid chamber defined within said bore and fluidically connected to a first wheel brake cylinder means of said vehicle, such that said master cylinder, said first and second chambers, and said first wheel brake cylinder means define said first brake line;

pressure control valve means, including first stepped piston means, a valve member cooperable with said piston means, disposed within said first brake line and said first and second fluid chambers, for controlling fluidic communication between said first and second chambers and for limiting the fluid pressure transmitted from said master cylinder to said first brake line and retainer means supported in said shoulder for engaging said valve;

a third fluid chamber defined within said bore and fluidically connected to said master cylinder and second wheel brake cylinder means of said vehicle, respectively, wherein said master cylinder, said third chamber and said second wheel brake cylinder means define said second brake line;

said first stepped piston means including a first pressure receiving area for receiving hydraulic pressure from said second wheel brake line, and second and third pressure receiving areas for receiving hydraulic pressure from said first wheel brake line, said third area being larger than said first which, in turn, is larger than said second, said pressure fluids received upon said first and third pressure areas acting in opposite directions;

said valve member cooperable with said third area for performing said pressure control function; and failure-warning means, operatively connected to said first stepped piston means to be actuated thereby, for indicating a failure within said first and second brake lines;

whereby said first stepped piston is axially movable within said bore to actuate said failure-warning means when said first and second brake lines are subjected to a fluidic failure, respectively, and said pressure control valve means is terminated and full master brake cylinder pressure is supplied to said first wheel brake cylinder means through said first brake line when said second brake line is subjected to a fluidic failure.

* * * * *